Aug. 29, 1933.  L. N. CRICHTON  1,924,307
RELAY SYSTEM
Filed Jan. 23, 1930
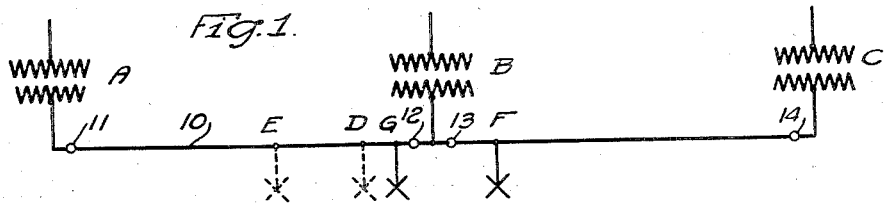
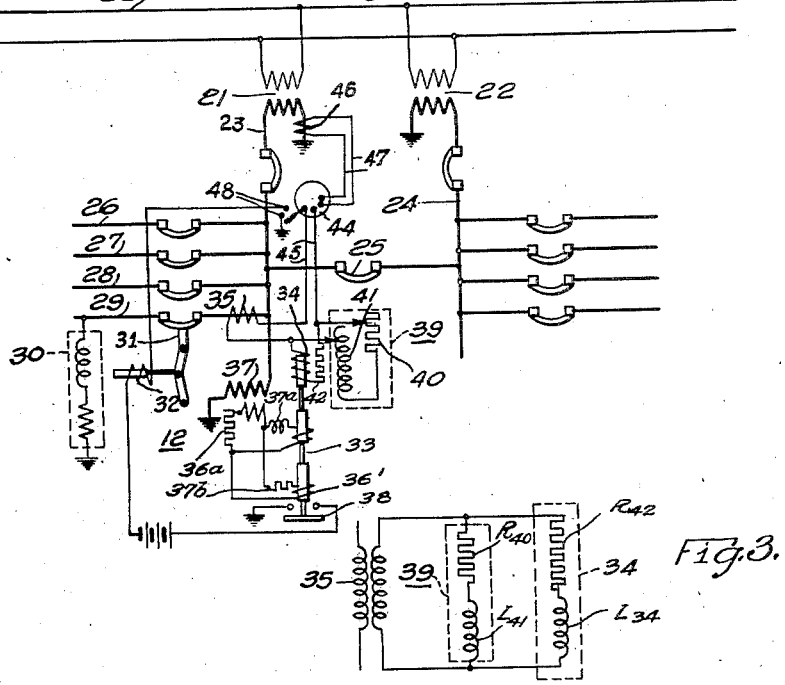
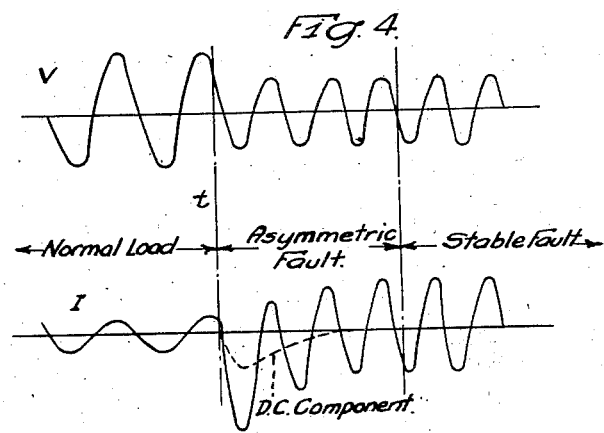
INVENTOR
Leslie N. Crichton.
ATTORNEY Patented Aug. 29, 1933

1,924,307

UNITED STATES PATENT OFFICE 1,924,307

RELAY SYSTEM

Leslie N. Crichton, East Orange, N. J., assignor to Westinghouse Electric & Manufacturing Company, a Corporation of Pennsylvania Application January 23, 1930. Serial No. 422,965

15 Claims. (Cl. 175—294)

This application is a substitute for, and a continuation-in-part of, my application Serial No. 388,281, filed August 26, 1929.

My invention relates to protective systems, and, in particular, to protective systems utilizing an instantaneous impedance relay, although it may be applied in connection with relays of other types, e.g., the well-known instantaneous overcurrent relay, for tripping a circuit breaker for isolating a faulty transmission line.

The principal object of my invention is to eliminate false operations of such relays, in systems of the type designated, as a result of the occurrence of an asymmetric fault upon the circuit to be protected.

It is well known that, in an alternating-current circuit containing reactance which is mainly inductive, upon the initial application of voltage thereto, upon a sudden increase of the applied voltage or upon the occurrence of a sudden short circuit, the current which begins to flow does not, in general, instantly reach an amplitude corresponding to that determined by the steady-state impedance of the circuit. Unless the change begins at a time when the instantaneous voltage is maximum, there will be a uni-directional transient current superposed upon the new steady-state value of the alternating current in the circuit. This transient current has a logarithmic decrement and disappears in a few cycles. While it exists, the instantaneous values of alternate half-cycles of the current in the circuit will be higher than those corresponding to the current characteristic of the steady-state impedance of the circuit, the other half-cycles having lower values. These phenomena have contributed to make it difficult or impossible, heretofore, to increase the speed of the tripping relay to operating periods less than about 2 cycles, in circuits where asymmetric faults are of frequent occurrence.

The impedance relay comprises a current winding, which is adapted to be energized in proportion to the current traversing the circuit to be protected, and a restraining winding energized in proportion to the voltage of the circuit. The impedance relay, therefore, actually responds to a critical value of the ratio of the voltage across the circuit to the current traversing the same, or, in other words, the apparent impedance of the load circuit. When the impedance of the load circuit is below a certain value, it is obvious that safety to generating and transmitting apparatus requires that the load circuit be disconnected from its energy source.

Because of the distortion of the fault current in the case of an asymmetric fault, as previously described, the abnormally high values of some of the half-waves of the current during the first few cycles of the fault sometimes cause the relay to be operated, although the stable value of the fault current is below the setting of the relay. In other words, a quick-acting relay, if used alone, is subject to false operation upon the occurrence of an asymmetric fault, in view of the fact that such a relay operates within the period when the asymmetrical component is very strong, sometimes making the first half-wave of current much larger than the actual alternating-current component, and sometimes making it much smaller.

In order to obviate the tendency of asymmetric faults to produce false operation of impedance relays, I employ a shunt which is connected across the current winding of the impedance relay and which has such characteristics that the direct-current component of the asymmetric fault-current will traverse the shunt instead of the relay winding, so that the latter will be affected solely by a current proportional to the stable value of the fault-current.

For a more complete explanation of my invention, reference should be had to the accompanying drawing, in which Figure 1 is a single-line diagram of a circuit to which my invention may be applied;

Fig. 2 is a more detailed diagram of a portion of the system shown in Fig. 1;

Fig. 3 is an equivalent-circuit diagram of the relay and associated apparatus of Fig. 2; and Fig. 4 is a set of oscillograms indicating the variation of current and voltage in the load circuit upon the occurrence of an asymmetric fault.

Referring first to Fig. 4, the curve V illustrates the line voltage of a distribution circuit, while the curve I illustrates the current traversing said circuit. Assuming that an asymmetric fault occurs at the time $t$, the first few cycles of the fault current are abnormally displaced, the direct-current component being opposed to the instantaneous value of the alternating current at the time $t$. The even half-cycles are of smaller amplitude than that of the normal short-circuit current, while the odd half-cycles are of much greater amplitude than that of the stable fault current. It is obvious from Fig. 4 that a quick-acting relay that should be responsive to the magnitude of the current traversing the circuit would be subject to false operation because of this characteristic of the fault current.

Referring now to Fig. 1, a distribution system is illustrated comprising transformer substations A, B and C and a distribution circuit 10. The substation transformers may be fed from a high-tension transmission line (not shown in Fig. 1). At the ends of the sections AB and BC, relays and circuit interrupters are located and are indicated schematically at 11, 12, 13 and 14. In systems of this type, it is desired that the circuit breakers at 11 and 12 shall trip simultaneously upon the occurrence of a fault at any point between the ends of that section. It is also desired to prevent tripping of circuit breakers in one section as a result of the occurrence of a fault in the next adjoining or serially connected section.

Assuming that an asymmetric fault occurs at the point D near one end of the line-section AB, the relay at 11, at the other end of that line-section, will be affected thereby to cause the tripping of the circuit breaker associated therewith. Since the fault is asymmetric, however, the effect of the current winding of the impedance relay is multiplied because of the abnormal values of current flowing in the first few cycles of the fault, and the relay operates as if a symmetrical fault had occurred at a point E closer to the relay at 11. This results, as previously explained, from the fact that the impedance relay is responsive to the apparent impedance of the load circuit, and, since the apparent impedance is lower than the actual impedance, the distance from the relay to the fault is actually greater than would be indicated by relay operation. The false operation of the relay 11 in this case, however is on the safe side, since it is desired to trip the circuit breaker 11 on the occurrence of fault at any point within the section AB.

Assuming, however, that an asymmetric fault occurs at a point F slightly beyond the section AB, that is, in the section BC, the relay at 11 will be affected as if the fault were actually located at a nearer point G, within the sound section AB, in accordance with the foregoing explanation. In this case, the circuit breaker at 11 would be tripped needlessly, since the fault is actually in section BC and it is unnecessary and highly undesirable for any breakers other than the breakers at 13 and 14, in the faulty section BC, to be tripped. The necessity for some means to eliminate the effect of asymmetry in the fault-currents thus becomes apparent.

In Fig. 2, is illustrated, in more detail, a portion of the circuit shown in Fig. 1 and, in particular, that portion of the circuit which is associated with the relay and circuit breaker at 12 in station B. A high-tension transmission line 20 supplies energy through power transformers 21 and 22 to the substation buses 23 and 24 which are adapted to be connected by a bus tie switch 25. From the bus 23, a number of parallel-connected distribution circuits 26, 27, 28 and 29 extend to any type of load device which, in the case under consideration, is the motive equipment of an electric railway system, illustrated schematically as a load device at 30. Circuit breakers, such as 31, are provided for isolating the distribution conductors from the bus 23.

The circuit breaker 31 is provided with a tripping coil 32 under the control of an impedance relay 33. The impedance relay comprises an actuating winding 34 adapted to be energized from a current transformer 35 in accordance with the current traversing the conductor 29. In addition to the current-responsive actuating winding 34, a restraining winding, preferably divided into two parts 36, 36', is provided to oppose the effect of the actuating winding 34 of the impedance relay. The restraining windings 36, 36' are energized, through an adjusting rheostat 36ª, from a potential transformer 37, in accordance with the voltage on the bus 23. Each of the three windings 34, 36 and 36' is provided with its own armature, and the two voltage windings 36 and 36' are dephased, by means of a reactor 37ª and a resistor 37ᵇ, respectively, for the purpose of breaking up the force-pulsations and preventing chattering, when the relay-action is speeded up to something of the order of ½ cycle to operate, or, in general, to within 2 cycles and preferably within 1 cycle, after the relay-setting has been exceeded. When the relay 34 is operated, its contact 38 is closed to complete a circuit for the tripping coil 32 of the circuit breaker 31.

One of the novel features of my invention resides in the provision of a so-called transient shunt 39 which is made up of a resistor 40 and a reactor 41. The transient shunt 39 is an impedance device comprising reactance and resistance in substantially the same proportions as the average expectable relative proportions of reactance and resistance in the associated transmission line section, during the fault conditions which are the most difficult from a relaying standpoint. In other words, the transient shunt has substantially the same time-constant as the line-section under fault conditions.

The transient shunt 39 is connected in parallel across the current-responsive actuating winding 34 of the impedance relay 33, said current-responsive winding 34 being disposed in a circuit comprising a serially connected resistor 42 which is sufficiently large to give the current-winding circuit a very short time-constant, as compared to the transmission line, so that the transient shunt 39 will behave in a manner very similar to the faulty line and will absorb the transient asymmetrical component of the short-circuit current, so that the current-responsive winding 34 of the impedance relay will respond substantially exclusively to the real alternating-current component of the fault-current. This is a departure from previous relaying practice which has been strongly against inserting any resistance in series with a relay coil which is connected across a current transformer.

It is desirable to make the sum of the shunt and relay resistances, $R_{40}+R_{42}$, (Fig. 3), large as compared to the sum of the shunt and relay inductances, $L_{41}+L_{34}$. The resistance $R_{42}$ in series with the relay winding 34 is preferably so large that the transient part of the relay current will decrease to a negligible amount before the fault-current reaches its first peak value, that is, before the first quarter-cycle after the occurrence of a fault. In a 25-cycle system, a quarter of a cycle covers the time of .01 second; in a 60-cycle system, .0042 second. The transient part through the relay will have substantially disappeared within the time of approximately 3 times $T_1$, where $$T_1 = \frac{L_{41}+L_{34}}{R_{40}+R_{42}};$$

so that, by putting $T_1=.0033$ or .0014, according to the frequency, we find that the relay resistance $R_{42}$, in ohms, should be of the order of 300 or 700 times the sum of the shunt and relay inductances, $L_{41}+L_{34}$, in henrys, according as the frequency is 25 cycles or 60 cycles.

Numerous oscillographic tests of the invention described herein have demonstrated that, in every case of an asymmetric fault, the current traversing the relay winding did not exceed the value it attained when the fault current became stable. These results indicate conclusively that the false operation of an impedance relay, as a result of the abnormally high currents set up by an asymmetric fault, may be entirely eliminated by the provision of a suitable transient shunt, such as that illustrated at 39.

Although the relay current, on test, never exceeded the value it finally attained when short-circuit conditions became normal, in some instances, the relay current did not immediately reach its stable short-circuit value. These cases were so few, however, and the delay so small that, for practical purposes, such operation may be neglected. This operation actually is in the nature of a safeguard against faulty relay operations, although it may in rare instances interpose a slight delay of a small fraction of a cycle at a small percentage of the times when tripping is necessary and desirable. As stated above, the transient-shunt adjustment is made such as to take substantially perfect care of the most difficult tripping operations, that is, for faults located near the remote end of the line-section, where faulty relay operation is most likely to occur, and where the relay time of operation is at its worst. A trifling delay for near-by faults, over the time obtainable without the transient shunt, is not at all important, and is not sufficient to make the relay-time materially longer than it is, for the remote faults, anyway.

It will be apparent that the invention herein described serves an exceedingly useful purpose in preventing unnecessary operations of circuit breakers and failures of circuit breakers to promptly operate upon the occurrence of faults in electrical distribution circuits. By the use of my invention, it is possible to prevent the tripping of any circuit breaker as a result of the occurrence of an asymmetric fault in an adjacent section. The operation of the impedance relays, furthermore, is made to agree accurately with the conditions actually obtaining in the circuit, that is to say, the relays will not indicate an erroneous value of load-circuit impedance, and operation of the circuit breakers, therefore, will not be effected until the impedance of the load circuit actually decreases to such value that it becomes necessary to isolate the circuit from its energy source.

It will be understood that suitable means will be provided for preventing the tripping of the circuit breakers when the current is flowing toward the bus, into a fault outside of the line-section being protected, instead of into the line-section. Such means may take the form of a directional relay, one exemplification of which is shown in the patent to MacGahan, No. 1,314,825, granted September 2, 1919; or an improved form is shown in my application Serial No. 393,433, filed September 18, 1929, which has been supplanted by a substitute application Serial No. 437,924, filed March 20, 1930. Directional relays are also shown in my copending applications Serial No. 208,803, filed July 27, 1927, and Serial No. 393,432, filed September 18, 1929.

In Fig. 2, I have illustrated a directional relay 44 by using the conventional symbol for a contact-making wattmeter, having two winding-circuits, one being energized, from the current in the line-section being protected, by being connected in series with the current-transformer 35 by means of the conductors 45, and the other being energized from any suitable source of comparison-current, as by means of a current-transformer 46 in the ground-lead of the secondary winding of the supply-transformer 21, as indicated by the connections 47. The directional relay 44 has contacts 48 in series with the energizing circuit of the tripping-coil 32 of the circuit-breaker 31.

Since my impedance relay 33 is instantaneously acting, it is necessary also for the directional relay 44 to be instantaneously acting, as will be obvious.

Since numerous modifications and changes in the system of my invention will, no doubt, occur to those skilled in the art, it is not my intention to be limited to the single embodiment thereof herein illustrated and described, except as necessitated by the terms of the appended claims and the prior art.

I claim as my invention:

1. The combination with a distribution circuit, and a circuit breaker therein for isolating said circuit, of an instantaneous relay having actuating and restraining windings, means for energizing said actuating windings substantially exactly in proportion to the current traversing said circuit, means for energizing said restraining windings substantially exactly in proportion to the voltage of said circuit, and a shunt connected in parallel with said actuating winding, comprising inductive reactance and resistance in series.

2. A protective system for an electric circuit comprising an interrupter in said circuit, and a relay for controlling said interrupter, an actuating winding for said relay, means for energizing said actuating winding in accordance with the alternating current component traversing said circuit and an external impedance device connected in parallel with said winding having a ratio of inductance to resistance corresponding substantially to that of said circuit.

3. A tripping system for a circuit breaker in an electric circuit comprising a relay having an actuating winding for tripping the breaker in response to a fault on said circuit and means connected across said winding for by-passing the direct-current component of the current resulting from the occurrence of an asymmetric fault, whereby said winding is energized only substantially in accordance with the symmetrical alternating-current component of the fault current.

4. A tripping system for a circuit breaker in an electric circuit comprising a relay having an actuating winding for tripping the breaker in response to a fault on said circuit and an external impedance device connected across said winding for by-passing the direct-current component of the current set up by an asymmetric fault whereby said winding is energized only substantially in accordance with the symmetrical alternating-current component of the fault current.

5. An alternating-current electrical transmission-line system having a sectionalizing station including circuit-breaker means at each end of a line-section, an instantaneously operating impedance relay at each end of the section for responding to a decrease in the impedance ratio of voltage to current below a predetermined critical value of said ratio, means for causing said impedance relays to respond substantially to the alternating-current value of the fault-current, regardless of its asymmetric direct-current component, and means responsive to the operation of said impedance relays for quickly tripping the circuit-breaker means.

6. An alternating-current electrical transmission-line system having a sectionalizing station including circuit-breaker means at each end of a line-section, an instantaneously operating relay at each end of the section for controlling the circuit-breaker means, each of said relays having a current-responsive actuating winding, and means for causing said relays to respond substantially to the alternating-current value of the fault-current, regardless of its asymmetric direct-current component.

7. An alternating-current electrical transmission-line system having a sectionalizing station including circuit-breaker means at each end of a line-section, an instantaneously operating fault-responsive relay at each end of the section for controlling the circuit-breaker means, each fault-responsive relay comprising current-responsive windings and voltage-responsive windings, each of the current-responsive winding-circuits having a large resistance as compared to its reactance and being shunted by a transient impedance shunt including serially connected inductance and resistance having such time constant as to minimize the effect, on the fault-responsive relay, of the asymmetric components of asymmetrical fault currents, an instantaneously operating reverse-current relay associated with each fault-responsive relay or group of relays, and means responsive to the operation of any one of said fault-responsive relays and to the position of its associated reverse-current relay for quickly tripping the circuit-breaker means.

8. An alternating-current electrical transmission-line system having a sectionalizing station including circuit-breaker means at each end of a line-section, an instantaneously operating relay at each end of the section for controlling the circuit-breaker means, each of said relays having a current-responsive actuating winding, each of the current-responsive winding-circuits having a resistance which is sufficiently large to give the current-winding circuit a very short time-constant, as compared to the transmission line, and being shunted by a transient impedance shunt including serially connected inductance and resistance having such time-constant as to minimize the effect, on the relay, of the asymmetric components of asymmetrical fault currents.

9. An alternating-current electrical transmission-line system having a sectionalizing station including circuit-breaker means at each end of a line-section, and an instantaneously operating relay at each end of the section for controlling the circuit-breaker means, each of said relays having a current-responsive actuating winding, characterized by having a transient-shunt impedance device connected in shunt relation to said actuating winding, said impedance device comprising inductance reactance and resistance in substantially the same proportions as the average expectable relative proportions of reactance and resistance in the associated transmission line section, during the fault conditions which are the most difficult from a relaying standpoint, and characterized further by having such resistance in the winding-circuit which is shunted by said impedance device as to cause said winding to respond substantially exclusively to the real alternating-current component of a fault-current.

10. An alternating-current electrical transmission-line system having a sectionalizing station including circuit-breaker means at each end of a line-section, and instantaneously operating tripping means for controlling the circuit-breaker means, said tripping means including an instantaneous fault-responsive relay associated with means having the effect of causing the relaying operation to be discriminated as between currents flowing away from the adjacent sectionalizing station and currents flowing toward the same, said fault responsive relay having a current-responsive actuating winding, characterized by having a transient-shunt impedance device connected in shunt relation to said actuating winding, said impedance device comprising inductive reactance and resistance in substantially the same proportions as the average expectable relative proportions of reactance and resistance in the associated transmission line section, during the fault conditions which are the most difficult from a relaying standpoint, and characterized further by having such resistance in the winding-circuit which is shunted by said impedance device as to cause said winding to respond substantially exclusively to the real alternating-current component of a fault-current.

11. An alternating-current electrical transmission-line system having a sectionalizing station including circuit-breaker means at each end of a line-section, and instantaneously operating tripping means for controlling the circuit-breaker means, said tripping means including an instantaneous fault-responsive relay associated with means having the effect of causing the relaying operation to be discriminated as between currents flowing away from the adjacent sectionalizing station and currents flowing toward the same, said fault responsive relay having a current-responsive actuating winding, characterized by each of the current-responsive winding-circuits having a resistance which is sufficiently large to give the current-winding circuit a very short time-constant, as compared to the transmission line, and being shunted by a transient impedance shunt including serially connected inductance and resistance having such time-constant as to minimize the effect, on the relay, of the asymmetric components of asymmetrical fault currents.

12. An alternating-current electrical transmission-line system having a sectionalizing station including circuit-breaker means at each end of a line-section, and instantaneously operating tripping means for controlling the circuit-breaker means, said tripping means including an instantaneous fault-responsive relay associated with means having the effect of causing the relaying operation to be discriminated as between currents flowing away from the adjacent sectionalizing station and currents flowing toward the same, said fault-responsive relay having a current-responsive actuating winding, characterized by the current-responsive winding-circuit having a large resistance as compared to its reactance and being shunted by a transient impedance shunt including serially connected inductance and resistance having such time constant as to minimize the effect, on the fault-responsive relay, of the asymmetric components of asymmetrical fault currents.

13. An alternating-current electrical transmission-line system having a sectionalizing station including circuit-breaker means at each end of a line-section, and an instantaneously operating tripping means including an instantaneous fault-responsive relay for controlling the circuit-breaker means, characterized by said fault-responsive relay having an actuating winding which is connected in series with a substantially non-inductive resistor and with a current transformer associated with the line-section to be protected, said winding and resistor being shunted by an impedance device including serially connected inductance and resistance having a smaller ratio of resistance to reactance than said winding and resistor.

14. An alternating-current electrical transmission-line system having a sectionalizing station including circuit-breaker means at each end of a line-section, and an instantaneously operating relay at each end of the section for controlling the circuit-breaker means, each of said relays having a current-responsive actuating winding, characterized by having a transient-shunt impedance device connected in shunt relation to said actuating winding, said impedance device including serially connected inductance and resistance having substantially the same time constant as the line-section under fault conditions, and characterized further by the fact that the winding-circuit which is shunted by said impedance device has a resistance, in ohms, of the order of several hundred times the sum of the inductances of said winding and said impedance device, in henrys.

15. An alternating-current electrical transmission-line system having a sectionalizing station including circuit-breaker means at each end of a line-section, and an instantaneously operating tripping means including an instantaneous relay for controlling the circuit-breaker means, characterized by said relay having an actuating winding which is connected in series with a substantially non-inductive resistor and with a current transformer associated with the line-section to be protected, said winding and resistor being shunted by an impedance device including serially connected inductance and resistance having a smaller ratio of resistance to reactance than said winding and resistor.

LESLIE N. CRICHTON.